United States Patent [19]

Shirasaki et al.

[11] Patent Number: 5,080,486
[45] Date of Patent: Jan. 14, 1992

[54] SPECTRUM MEASURING EQUIPMENT UTILIZING DOUBLE-IMAGE POLARIZING ELEMENT

[75] Inventors: Masataka Shirasaki; Hirochika Nakajima, both of Kawasaki; Yukimitsu Watanabe; Rinichiro Yamamoto, both of Tokyo, all of Japan

[73] Assignees: Fujitsu Limited, Kawasaki; Advantest Corporation, Tokyo, both of Japan

[21] Appl. No.: 581,596

[22] Filed: Sep. 12, 1990

[30] Foreign Application Priority Data

Sep. 12, 1989 [JP] Japan .................. 1-235967

[51] Int. Cl.⁵ .............. G01J 3/18; G01J 3/32
[52] U.S. Cl. .................. 356/327; 356/328; 356/334
[58] Field of Search .......... 356/322, 326, 327, 328, 356/331, 332, 333, 334, 364, 365

[56] References Cited

U.S. PATENT DOCUMENTS

| | | | |
|---|---|---|---|
| 3,432,238 | 3/1969 | Girard | 356/331 X |
| 3,937,577 | 2/1976 | Dorsch | 356/364 X |
| 4,995,724 | 2/1991 | Sonobe et al. | 356/319 |

FOREIGN PATENT DOCUMENTS

62-28623  2/1987  Japan .

Primary Examiner—Vincent P. McGraw
Attorney, Agent, or Firm—Staas & Halsey

[57] ABSTRACT

In spectrum measuring equipment the light to be measured is separated by a double-image polarizing element into two polarized wave components whose planes of polarization cross each other perpendicular and which have different optical axes. The two polarized wave components are applied to a dispersing element so that their planes of polarization intersect the direction of light separation at ±45° thereto, respectively. The sum of optical powers of the two polarized wave components separated by the dispersing element is measured by a photodetector, so that spectrum measurement independent of the polarization of the light to be measured can be achieved.

24 Claims, 5 Drawing Sheets

SPECTRUM MEASURING EQUIPMENT UTILIZING DOUBLE-IMAGE POLARIZING ELEMENT

BACKGROUND OF THE INVENTION

The present invention relates to spectrum measuring equipment which can be used with a spectrum analyzer, for instance.

The spectrum analyzer or similar spectrum measuring apparatus employs a prison and diffraction grating, or like dispersing element, whereby light to be measured is split into wave components of respective wavelengths.

Figure 1:
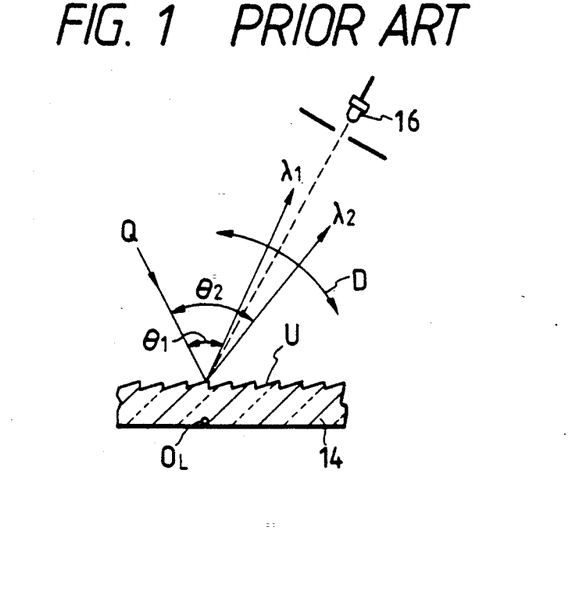
FIG. 1 is a side view of the structure of a dispersing element, for explaining its operation.

FIG. 1 shows in section the structure of a diffraction grating 14, which has about ten to hundreds of equally-spaced-apart minute grooves U per millimeter cut in the surface of sheet glass. When light to be measured Q, which has an optical axis in a plane perpendicular to the grooves U (i.e. in the plane of the paper of the drawing), is incident to the diffraction grating 14, light waves of wavelengths $\lambda_1$ and $\lambda_2$, for example, contained in the light Q, are dispersed and reflected in the direction of arrangement of the grooves U in the above-mentioned plane. The angles of dispersion, $\theta_1$ and $\theta_2$, of the light waves are dependent upon their wavelengths $\lambda_1$ and $\lambda_2$. In the following description the direction of change, D, in the angle of dispersion with wavelength will be referred to as the direction of separation of light, and each angle in the direction D as an angle of separation of light, i.e. an angle of diffraction. Consequently, the direction of light separation D is in the plane of the paper of the drawing FIG. 1.

The quantities of light of the wavelengths $\lambda_1$ and $\lambda_2$ thus dispersed or separated, are measured by scanning a photodetector 16 in the direction of light separation D relative to the diffraction grating 14. The wavelength distribution of light is obtained by detecting the levels of the received light signals developed at the positions of respective angles of light separation when the photodetector 16 is scanned in the direction of light separation D. The scanning of the photodetector 16 relative to the diffraction grating 14 in the direction of light separation D may be done by turning the diffraction grating 14 or moving the photodetector 16 in the direction D. It is customary in the art to turn the diffraction grating 14 in the direction of light separation D about a straight line $O_L$ parallel to the grooves U.

Incidentally, the dispersing element such as a diffraction grating has a shortcoming that when the light to be measured Q incident thereto is polarized light, the diffraction efficiency varies with the angle of its plane of polarization, causing a change in the quantities of light of the wavelengths $\lambda_1$ and $\lambda_2$ to be dispersed or separated. This phenomenon is commonly referred to as a polarization dependency of the dispersing element.

Figure 2:
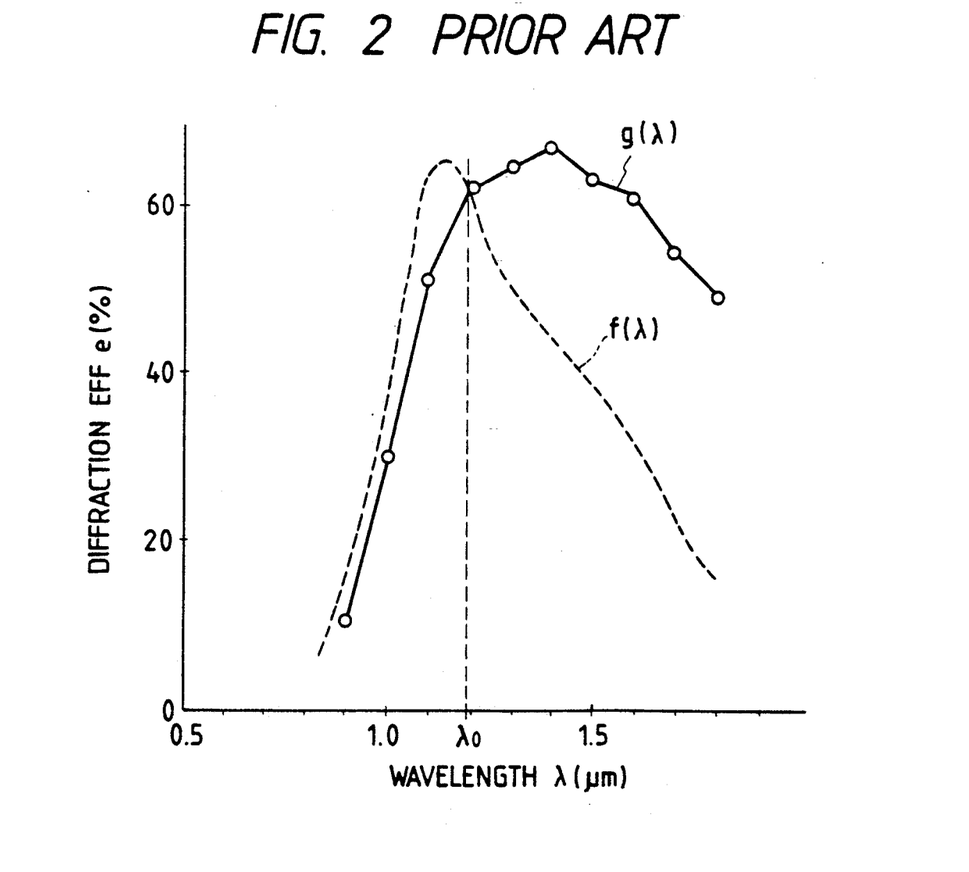
FIG. 2 is a graph for explaining the polarization dependency of the dispersing element.

FIG. 2 shows the polarization dependency characteristic of the diffraction grating. The curve $g(\lambda)$ represents the diffraction efficiency for the light wave of each wavelength in the case where the plane of polarization of the incident light is parallel to the direction of light separation D, i.e. where the plane of polarization is perpendicular to the grooves U of the diffraction grating 14. The curve $f(\lambda)$ represents the diffraction efficiency for the light wave of the wavelength in the case where the plane of polarization of the incident light is perpendicular to the direction of light separation D, i.e. where the plane of polarization is parallel to the grooves U of the diffraction grating 14. What is meant by the two curves $g(\lambda)$ and $f(\lambda)$ is that when the plane of polarization of light incident to the diffraction grating has turned from the direction parallel to the direction of light separation D to the direction perpendicular thereto, the diffraction efficiency varies from the curve $g(\lambda)$ to $f(\lambda)$, that is, the level of diffracted light at each wavelength varies accordingly. As will be seen from FIG. 2, the diffraction grating has no polarization dependency only at a wavelength $\lambda_0$, but has the polarization dependent characteristics at other wavelengths. In the case of measuring light emitted from an optical fiber, the influence of variations in the diffraction efficiency of the dispersing element is particularly great, because the plane of polarization of the emitted light has undergone substantial variations according to the state of the optical fiber.

In Japanese Patent Application Laid Open No. 28623/87 there is proposed spectrum measuring equipment which has solved the above problem. The spectrum measuring equipment disclosed in that publication has an arrangement in which the light to be measured is dispersed or separated by a dispersing element, the dispersed light is split by a polarizing element into polarized light components P and S whose planes of polarization are perpendicular to each other. The P and S polarized components are applied to two different photodetectors to obtain electric signals corresponding to the quantities of light of the P and S polarized components. Based on the electric signals, the diffraction efficiencies Ap and Bs of the polarized components P and S in the dispersing element, the loss ratios Cp and Ds of the polarized components P and S in the polarizing element, and the photoelectric conversion efficiencies L1 and L2 of the photodetectors, stored in a memory for each wavelength, are read out for obtaining the absolute power of the light Q through calculation. With this conventional spectrum measuring equipment, it is possible to avoid the influence of the change in the diffraction efficiency due to the difference in angle between the planes of polarization in the dispersing element. To perform this, however, it is necessary to prestore, in the memory, correction data such as the diffraction efficiencies Ap and Bs of the dispersing element for the polarized components P and S, the loss ratios Cp and Ds for the polarized components P and S in the polarizing element, and the photoelectric conversion efficiencies L1 and L2 of the photodetectors. Since the correction data is needed for each wavelength, an appreciable amount of data must be prepared for measurement with high resolution. Further, since the data differs in value with different products, the preparation of such data is time-consuming and hence introduces complexity in the fabrication of equipment. Moreover, since there are cases where the spectrum measurement may sometimes be subject to the influence of variations in the diffraction efficiency according to the values of the correction data stored in the memory, the polarization dependency of the dispersing element cannot always be eliminated.

SUMMARY OF THE INVENTION

It is therefore an object of the present invention to provide spectrum measuring equipment which permits elimination of the polarization dependency of the necessity of prestoring various kinds of correction data in a memory.

The spectrum measuring equipment of the present invention is made up of a double-image polarizing element for separating in advance light to be measured into two polarized wave components which have planes of polarization perpendicular to each other and have different optical axes, a dispersing element which is irradiated by the two polarized wave components with their planes of polarization intersecting the direction of light separation at angles of ±45° thereto and whereby the wave components of the same wavelength contained in the two polarized waves are separated at the same angle of separation, and optical power measuring means for measuring the sum of powers of the two polarized waves thus separated by the dispersing element.

According to the present invention, since the light to be measured is applied to the dispersing element after being separated into two polarized light waves so that their planes of polarization cross the light-separating direction of the dispersing element at ±45° thereto, the diffraction efficiencies for the two polarized light waves are equal Hence, even if the plane of polarization of the light to be measured changes, the powers of the two polarized light waves vary complementarily and their sum always remains constant. As a result, the polarization dependency of the dispersing element can be removed by obtaining the sum of the optical powers of wave components of each wavelength separated from the two polarized light waves. Thus, the present invention permits elimination of the polarization dependency of the dispersing element without involving the necessity of using the afore-mentioned correction data, and offers simple-structured, easy-to-manufacture spectrum measuring equipment. Besides, since no correction data is needed, no limitations are imposed on resolution for the direction of wavelength —this allows highly accurate spectrum measurements.

DESCRIPTION OF THE PREFERRED EMBODIMENTS

Figure 3:
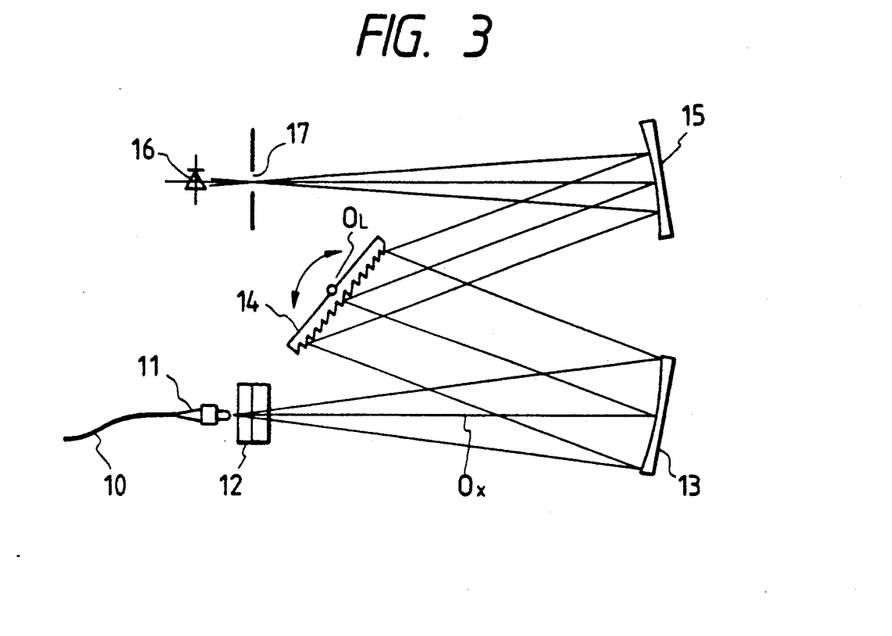
FIG. 3 is an optical diagram illustrating an embodiment of the present invention.

FIG. 3 illustrates an embodiment of the present invention. Reference numeral 11 indicates a light source for emitting light to be measured. In this embodiment the light is shown to be transmitted over an optical fiber 10.

Figure 4:
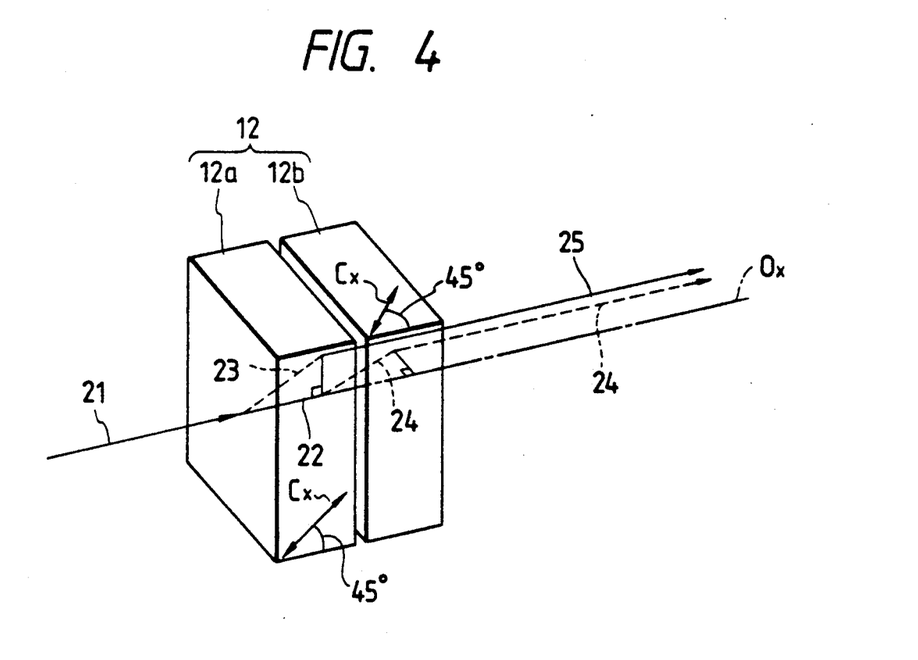
FIG. 4 is a side view explanatory of the operation of a double-image polarizer used in the present invention.

Reference numeral 12 denotes a double-image polarizing element whereby the light emitted from the light source 11 is split into two polarized light components whose planes of polarization perpendicularly cross each other. The double-image polarizing element 12 has a function of separating the incident light into two beams having different optical axes, as well as the function of splitting the light into the above-mentioned two polarized wave components. Such a double-image polarizing element is presently available in the commercial marketplace. An example of the double-image polarizing element is a Savart plate. The Savart plate has a structure in which two plane-parallel plates 12a and 12b of exactly the same thickness, each produced by cutting crystal, such as calcite or similar uniaxial crystal, obliquely to its crystal axis, are pasted together, with their principal sections turned 90° apart as shown in FIG. 4.

An ordinary ray 22 in the first plate 12a of the Savart plate becomes an extraordinary ray 24 in the second plate 12b, whereas an extraordinary ray 23 in the first plate 12a becomes an ordinary ray 25 in the second plate 12b. Hence, by the passage of the two polarized components through the first and second plates 12a and 12b, their optical axes are once displaced laterally in parallel at right angles to each other. That is, the incident light 21 is separated into two rays 24 and 25 polarized perpendicularly with respect to each other.

Figure 5A:
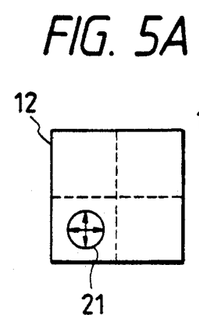
FIGS. 5A, 5B, 5C and 5D are front views of the double-image polarizer of FIG. 4 for explaining its operation.
Figure 5B:
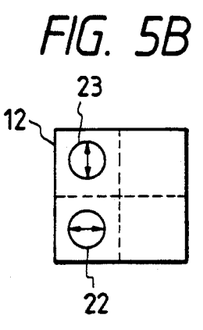
Figure 5C:
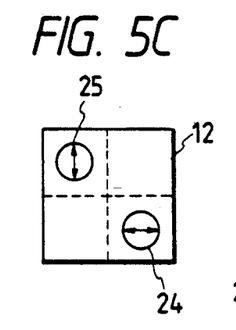
Figure 5D:
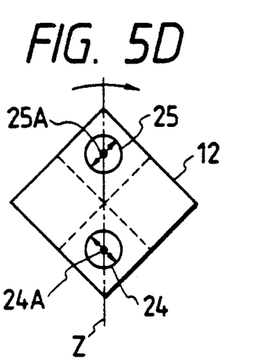

FIGS. 5A, 5B, 5C and 5D show how the above phenomenon occurs. FIG. 5A shows arbitrarily polarized light 21 incident to the first plate 12a. FIG. 5B shows the relationship between the ordinary ray 22 incident to the second plate 12b from the first plate 12a and the laterally displaced extraordinary ray 23 at the boundary between the first and second plates 12a and 12b. FIG. 5C shows the relationship between the ordinary ray 25 of the polarized light 23 incident to the second plate 12b and the laterally displaced extraordinary ray 24 of the polarized light 22 incident to the second plate 12b, the arrows indicating the directions of polarization. Turning FIG. 5C through 45°, for example, clockwise in the plane of the paper, the polarized rays are displaced in the vertical direction as shown in FIG. 5D, and as a result of this, two beams 24 and 25 are obtained which have parallel optical axes and which have a polarization direction at ±45° with respect to the vertical axis Z, respectively.

In FIG. 3 the double-image polarizing element 12 is shown to be disposed so that its Z axis shown in FIG. 5D is parallel to the center axis of rotation, $O_L$, of the dispersing element 14. In FIGS. 5A through 5D the beams 22 and 23 and the beams 24 and 25 are shown to be spaced apart, but in practice, their lateral displacement is small as compared with their diameters, and the beams 24 and 25 substantially overlap each other.

The two polarized rays 24 and 25 separated by the double-image polarizing element 12 are each reflected by a collimator mirror 13 into parallel rays for incidence to the dispersing element 14

Figure 6:
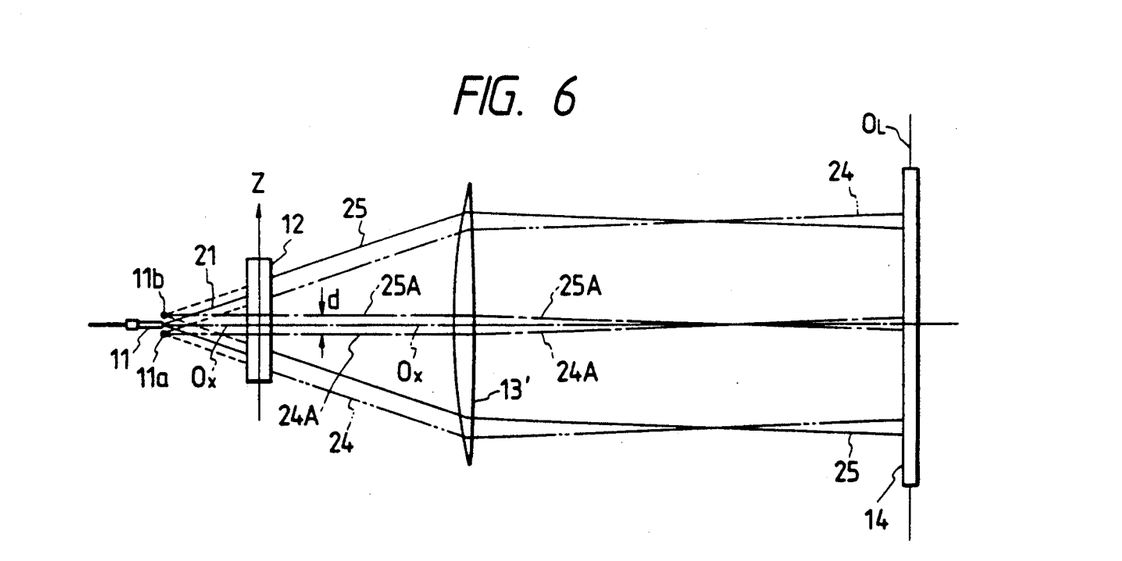
FIG. 6 is a diagram for explaining beams and their optical axes from a light source 11 to a dispersing element 14.
Figure 7:
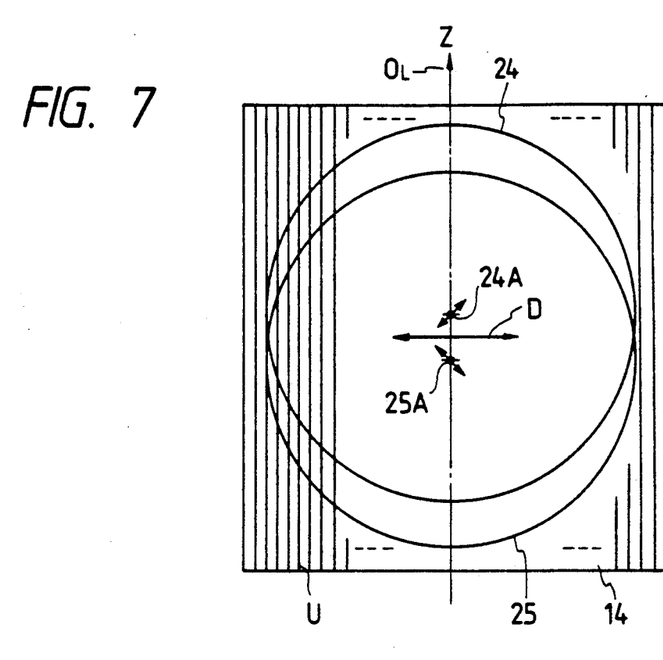
FIG. 7 is a front view for explaining how the dispersing element used in this embodiment is irradiated with two polarized light waves.

To facilitate a better understanding of the embodiment depicted in FIG. 3, FIG. 6 shows an optical system in which the light source 11, the double-image polarizing element 12, a collimator lens 13' as a substitute for the collimator mirror 13 in FIG. 3 and the dispersing element 14 are arranged in this order on a straight line. The optical system is shown in section along its optical axis Ox and parallel to the center axis of rotation, $O_L$, of the dispersing element 14. The beam 21 emitted from the light source 11 disposed at the focal point of the collimator lens 13' is incident to the double-image polarizing element 12, from which the two polarized beams 24 and 25 having their planes of polarization tilted at ±45° to the Z axis, as described above in respect of FIG. 5D, are emitted while being displaced from each other in the Z-axis direction. The beams 24 and 25 are indicated by the broken line and the solid line, respectively, so that they are readily distinguishable from each other. The center axes 24A and 25A of these polarized beams 24 and 25 are parallel to the optical axis Ox. The polarized beams 24 and 25 rendered by the collimator lens 13' into parallel beams for incidence to the dispersing element 14, but as shown in FIG. 6, the center axes 24A and 25A of the parallel beams 24 and 25 which are in the plane containing the Z axis and the optical axis Ox, cross each other on the focal plane of the collimator lens 13'. That is, when the dispersing element 14 is not on the focal plane of the collimator lens 13', for example, when it is disposed far from the focal surface, the polarized beams 24 and 25, which are incident to, for example, the grating surface of a diffraction grating used as the dispersing element 14, are shifted from each other in the Z-axis direction, i.e. in the direction of extension of the grooves U as shown in FIG. 7.

By separating the light from the same light source 11 by the double-image polarizing element 12 into the two polarized beams 24 and 25 of different optical axes, the two beams 24 and 25 can be handled essentially as beams emitted from two different light sources 11a and 11b as depicted in FIG. 6. Accordingly, even if the two beams 24 and 25 propagate in the same space, or even if they are reflected by the collimator mirror 13, the dispersing element 14, or a converging mirror 15 while overlapping each other on the same plane, their polarization properties are retained. Consequently, the two polarized beams 24 and 25 are individually separated by the dispersing element 14 and the separated beams are converged by the converging mirror 15, thereafter being applied through a slit 17 to the photodetector 16 such as a photodiode.

The width of the slit 17 is selected based on the wavelength resolution required of the spectrum measuring equipment. On the other hand, the height of the slit 17 (the length in the Z-axis direction) is desired to be as small as possible from the viewpoint of shielding the photodetector 16 from stray light. In practice, however, it is difficult to form the slit 17 so that it cuts off in the Z-axis direction the two polarized beams 24 and 25 shifted from each other in the Z-axis direction without changing the ratio of their quantities of light at all times. It is therefore necessary to select the height of the slit 17 so that the polarized beams 24 and 25 condensed by the converging mirror 15 shown in FIG. 3 pass through the slit 17 without being cut off in the Z-axis direction perpendicular to the direction of light separation.

In FIG. 3, letting the focal distance of the collimator mirror 13, the focal distance of the converging mirror 15 and the height of an object in the Z-axis direction disposed on the focal plane of the collimator mirror 13 (on which the light emitting end of the light source 11 is placed in FIG. 3) be represented by $f_1$, $f_2$ and $Y_M$, respectively, the height $Y_1$ in the Z-axis direction of an image of the object which is formed on the focal plane of the converging mirror 15 (on which the slit 17 is disposed in FIG. 3) is given by $Y_1 = Y_M \cdot f_2/f_1$. On the other hand, letting the distance between the center axes 24A and 25A of the two polarized beams 24 and 25 shifted by the Savart plate 12 described previously with respect to FIG. 6 and the diameter of the light emitting end face of the light source 11 be represented by d and R, respectively, the diameters of the two apparent light sources 11a and 11b are also R, and the center-to-center distance therebetween is also d. Accordingly, the length of a segment which is transverse to the two light sources 11a and 11b in the Z-axis direction (i.e. the distance from the lower end of the light source 11a to the upper end of the light source 11b) is d + R. Incidentally, to prevent overlapping of the two light sources 11a and 11b, the distance d between the two optical axes caused by the thickness of the Savart plate 12 and the diameter of the light emitting end face of the light source 11 are selected so that d > R. Replacing the height $Y_M$ of the above-mentioned object in the Z-axis direction with d + R, the distance between the outermost edges of the pair images of the light sources 11a and 11b which are formed on the focal plane of the converging mirror 15, is expressed by $(d + R)f_2/f_1$. The height of the slit 17 can be made minimum on the focal plane of the converging mirror 15, but it must be selected slightly larger than $(d + R)f_2/f_1$.

The photodetector 16 receives the two polarized beams of the same wavelength as that of the wave components separated from the two polarized beams 24 and 25 and, for each wavelength, creates an electric signal corresponding to the sum of the powers of the two polarized beams. The electric signal from the photodetector 16 corresponding to the sum of the powers of the two polarized waves for each wavelength will not change even with the rotation of the plane of polarization of the light to be measured. Consequently, the electric signal retains a constant value for the rotation of the plane of polarization, without being affected by the polarization dependency of the dispersing element.

The reason for this will hereinafter be described, through the aid of mathematical expressions, in connection with the case where a diffraction grating is employed as the dispersing element 14.

Incident light to, and emitted light from, a diffraction grating with no measures taken against its polarization dependency are given by the following expressions (1) and (2):

$$P_{in}(\lambda) = P_{in}(\lambda, p) + P_{in}(\lambda, s) \quad (1)$$

$$P_o(\lambda) = f(\lambda) \cdot P_{in}(\lambda, p) + g(\lambda) \cdot P_{in}(\lambda, s) \quad (2)$$

Figure 8:
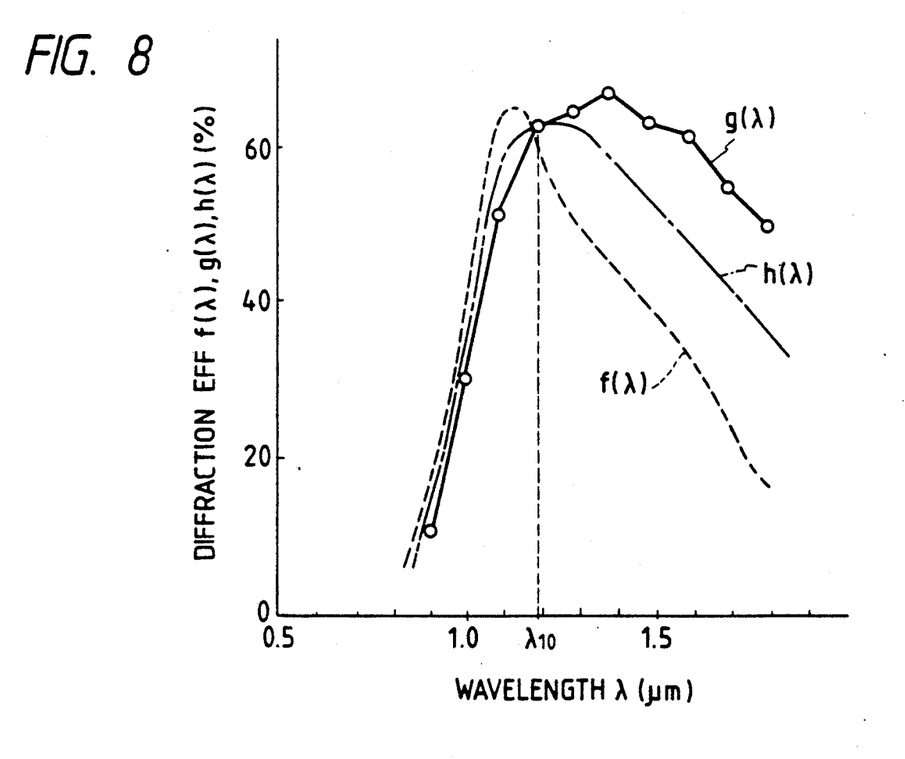
FIG. 8 is a graph for explaining the operation of the present invention.

In the above, $P_{in}(\lambda)$ is the quantity (i.e. power) of incident light of wavelength $\lambda$; $P_{in}(80, p)$ is the quantity of light of the polarization component p in the direction of the grooves of the diffraction grating, contained in the incident light $P_{in}(\lambda)$; $P_{in}(\lambda, s)$ is the quantity of light of the polarization component s perpendicular to the direction of the grooves of the diffraction grating, contained in the incident light $P_{in}(\lambda)$; $P_{to}(\lambda)$ *is the quantity of emitted light of the diffracted component of wavelength* $\lambda$; *f(λ) is the diffraction efficiency for a polarized wave parallel (component p) to the* grooves U (see FIG. 8); and g(λ) is the diffraction efficiency for a polarized wave perpendicular (component s) to the grooves U (see FIG. 8). The expression (2) indicates that even if the power of the incident light is constant, a change in the state of polarization will change the power $P_{ot}(λ)$ of the diffracted wave component, that is, change the total diffraction efficiency.

In contrast thereto, according to the present invention, the incident light $P_{in}(λ)$ is separated by the double-image polarizing element into two beams whose planes of polarization are at ±45° to the grooves of the diffraction grating. Consequently, the incident light to the diffraction grating is expressed as follows:

$$P_{in}(λ) = P_{in+}(λ) + P_{in-}(λ) \quad (3)$$

where $P_{in+}(λ)$ is the quantity of incident light of the polarized component tilted at +45° to the grooves of the diffraction grating, and $P_{in-}(λ)$ is the quantity of incident light of the polarized component tilted at −45° to the grooves of the diffraction grating. Where the polarized components $P_{in+}(λ)$ and $P_{in-}(λ)$ are incident to the diffraction grating, they are separated to the direction along the grooves of the diffraction grating and the direction perpendicular thereto, as indicated by the following expressions:

$$P_{in+}(λ) = P_{in+}(λ, p) + P_{in+}(λ, s) \quad (4)$$

$$P_{in-}(λ) = P_{in-}(λ, p) + P_{in-}(λ, s) \quad (5)$$

Therefore, the quantities of emitted light for the respective polarized components are expressed as follows:

$$P_{ot+}(λ) = f(λ)P_{in+}(λ, p) + g(λ)P_{in+}(λ, s) \quad (6)$$

$$P_{ot-}(λ) = f(λ)P_{in-}(λ, p) + g(λ)P_{in-}(λ, s) \quad (7)$$

Where the plane of polarization of the incident light is tilted at ±45° to the grooves of the diffraction grating, the quantities of the light component (the polarization component p) along the grooves of the diffraction grating and the light component (the polarization component s) perpendicular thereto are equal to each other and are ½ the quantity of the incident light. That is, the following equations hold:

$$P_{in+}(λ, p) = P_{in+}(λ, s) = P_{in+}(λ)/2 \quad (8)$$

$$P_{in-}(λ, p) = P_{in-}(λ, s) = P_{in-}(λ)/2 \quad (9)$$

From expressions (6), (8) and expressions (7), (9) the following expressions hold:

$$P_{ot+}(λ) = P_{in+}(λ)\{f(λ) + g(λ)\}/2 \quad (10)$$

$$P_{ot-}(λ) = P_{in-}(λ)\{f(λ) + g(λ)\}/2 \quad (11)$$

Accordingly, the whole quantity of light, $P_{ot}(λ)$, emitted from the diffraction grating is given by the following expression:

$$\begin{aligned} P_{ot}(λ) &= P_{ot+}(λ) + P_{ot-}(λ) \\ &= \{f(λ) + g(λ)\}\{P_{in+}(λ) + P_{in-}(λ)\}/2 \\ &= \{f(λ) + g(λ)\}P_{in}(λ)/2 \end{aligned} \quad (12)$$

As will be seen from expression (12), the diffraction efficiency assumes always the mean value of $f(λ)$ and $g(λ)$ and remains constant for the incident light and does not depend on the state of polarization of the incident light. This verification applies as well to dispersing elements other than the diffraction grating.

Figure 9:
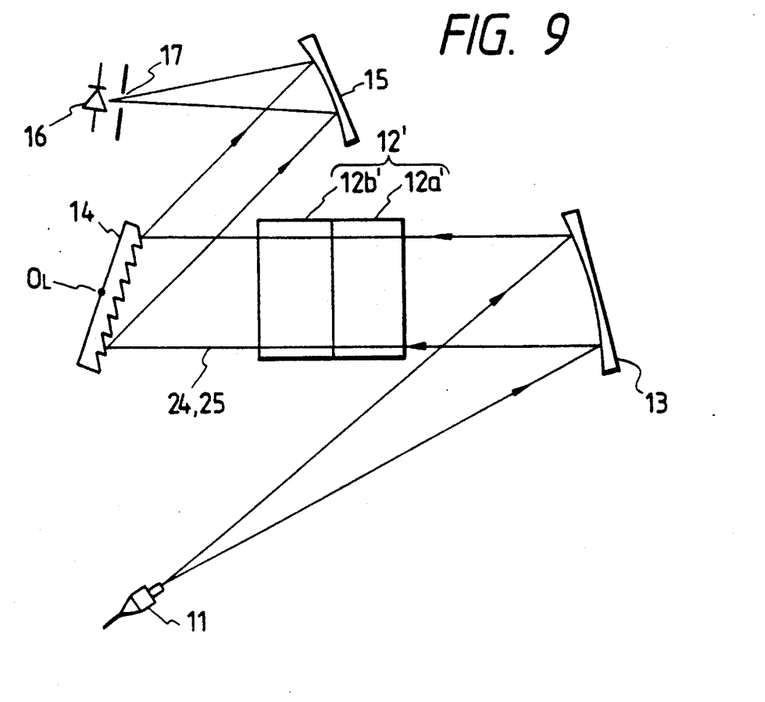
FIG. 9 is an optical diagram illustrating a second embodiment of the present invention.
Figure 10A:
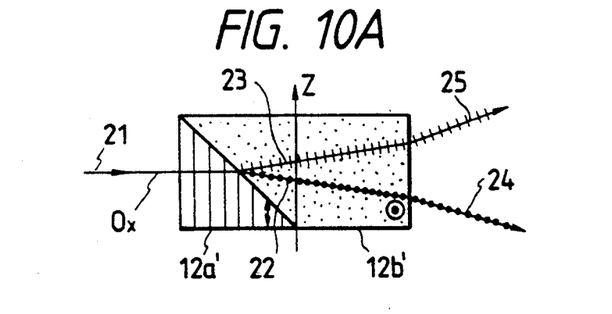
FIG. 10A is a side view of a double Wollaston prism.
Figure 10B:
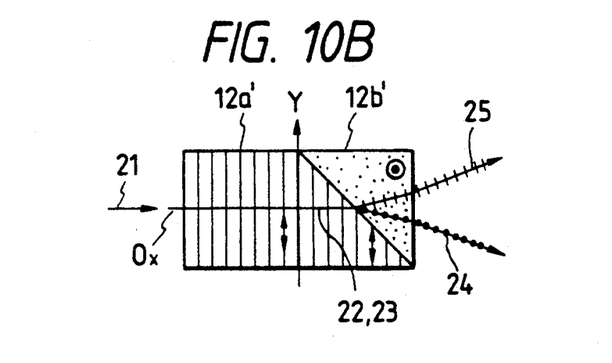
FIG. 10B is a plan view of the double Wollaston prism of FIG. 10A.
Figure 11A:
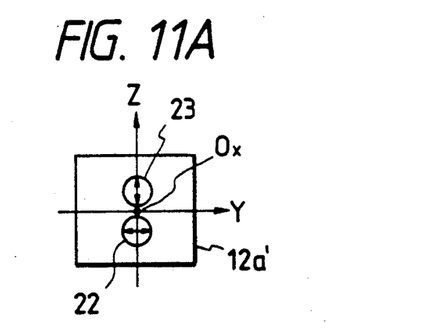
FIG. 11A and 11B are front views of the double Wollaston prism of FIG. 10A for explaining its operation.
Figure 11B:
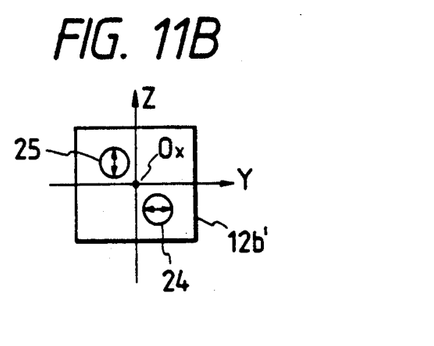

FIG. 9 illustrates another embodiment of the present invention, which employs, as the double-image polarizing element 12, a double Wollaston prism disposed between the collimator mirror 13 and the diffraction grating 14. The double Wollaston prism 12' has an arrangement in which two Wollaston prisms 12a' and 12b' are disposed on the common optical axis Ox but turned 90° apart as shown in FIGS. 10A and 10B which are its side and plan views, respectively. With this structure, as shown in FIG. 11A, the beam 21 incident to the first Wollaston prism 12a' is separated in the Z-axis direction to two beams 22 and 23 polarized perpendicularly to each other and these beams 22 and 23 are separated by the second Wollaston prism 12b' from each other in the Y-axis direction perpendicular to the optical axis Ox and the Z axis, and are emitted as the beams 24 and 25. Accordingly, by turning the double Wollaston prism 12' 45° about the optical axis Ox, the beams 24 and 25 are obtained which have their planes of polarization ±45° to the Z-axis direction and are spaced apart in the Z-axis direction as in the case described previously with respect to FIGS. 5C and 5D. By applying such beams 24 and 25 to the diffraction grating 14 so that the Z-axis direction is parallel to the center axis $O_L$ of rotation of the diffraction grating 14, the power of separated light which is not dependent on the direction of polarization, can be detected by the photodetector 16 as in the embodiment described above with respect to FIG. 3.

As described above, the present invention offers spectrum measuring equipment free from the polarization dependency of the dispersing element 14, ensuring accurate detection of the absolute value of optical power. Further, the present invention does not require the preparation of correction data in a memory for eliminating the polarization dependency of the dispersing element, and hence does not involve loading of the correction data. Consequently, the spectrum measuring equipment of the present invention is easy to manufacture.

Besides, since it is possible to continuously vary the wavelength and measure the quantity of light at a desired wavelength without employing the correction data, no limitations are imposed on resolution for the wavelength direction. Hence, the measurement accuracy can be enhanced by increasing the accuracy of the optical system.

While in the above the photodetector 16 is described to obtain the sum of optical powers of two polarized wave components, it is also possible to employ an arrangement in which the powers of the two polarized wave components are individually measured by two photodetectors, and the measured values are added together. The photodetector 16 is not limited specifically to the photodiode but it may also be constructed so that two polarized wave components are incident to and transmitted over a glass fiber, for example, and are then subjected to a photoelectric conversion, or input as light into other measuring equipment.

The dispersing element 14 need not always be a diffraction grating, but may be a prism or the like. By using a concave diffraction grating as the dispersing element 14, the collimator mirror 13 can be omitted.

Moreover, the double-image polarizing element is not limited specifically to the Savart plate or the double Wollaston prism, but other double-image polarizing elements ca be employed.

What is claimed is:

1. Spectrum measuring equipment comprising:
   a double-image polarizing element which separates light to be measured into two polarized wave components having respective planes of polarization perpendicularly intersecting each other and having different optical axes;

a dispersing element which is irradiated by said two polarized wave components from said double-image polarizing element, so that the planes of polarization of said two polarized wave components cross the direction of light separation at an angle of ±45° thereto, respectively, so that components of each wavelength contained in said two polarized wave components are separated at the same angle of separation; and light-quantity measuring means for measuring a sum of the quantities of light of the two polarized wave components of the same wavelength separated by said dispersing element.

2. The spectrum measuring equipment of claim 1, wherein said dispersing element is a diffraction grating.

3. The spectrum measuring equipment of claim 1, further comprising collimator means for rendering said two polarized wave components emitted from said double-image polarizing element into respective parallel rays for incidence to said dispersing element.

4. The spectrum measuring equipment of claim 1, wherein said double-image polarizing element is a Savart plate.

5. The spectrum measuring equipment of claim 1, further comprising collimator means for rendering the light to be measured into parallel rays for incidence to said double-image polarizing element.

6. The spectrum measuring equipment of claim 1, wherein said double-image polarizing element is a double Wollaston prism.

7. The spectrum measuring equipment of claim 6, wherein said double Wollaston prism comprises two Wollaston prisms disposed on the same optical axis and having directions of separation of polarized light held at right angles with respect to each other.

8. The spectrum measuring equipment of claim 1, further comprising converging means which is irradiated by light waves separated by said dispersing element, for converging the separated light waves onto said light-quantity measuring means.

9. The spectrum measuring equipment of claim 1, wherein said light-quality measuring means is a single photodetector which is irradiated by said two polarized wave components and which outputs an electric signal corresponding to the sum of the optical powers of said two polarized wave components.

10. The spectrum measuring equipment of claim 1, wherein said light-quantity measuring equipment includes a slit which is irradiated with separated light of said two polarized wave components from said dispersing element and which selectively extracts with a width of a desired wavelength, the length of said slit being selected such that said polarized wave component thus extracted passes through the slit without being cut off in a direction perpendicular to said direction of light separation.

11. The spectrum measuring equipment of claim 1, wherein said double-image polarizing element is disposed so that said two polarized wave components are shifted with respect to each other in a direction perpendicular to said direction of light separation.

12. The spectrum measuring equipment of claim 2, wherein said double-image polarizing element is a Savart plate.

13. The spectrum measuring equipment of claim 3, wherein said double-image polarizing element is a Savart plate.

14. The spectrum measuring equipment of claim 2, wherein said double-image polarizing element is a double Wollaston prism.

15. The spectrum measuring equipment of claim 5, wherein said double-image polarizing element is a double Wollaston prism.

16. The spectrum measuring equipment of claim 2, further comprising converging means which is irradiated by light waves separated by said dispersing element, for converging the separated light waves onto said light-quantity measuring means.

17. The spectrum measuring equipment of claim 3, further comprising converging means which is irradiated by light waves separated by said dispersing element, for converging the separated light waves onto said light-quantity measuring means.

18. The spectrum measuring equipment of claim 5, further comprising converging means which is irradiated by light waves separated by said dispersing element, for converging the separated light waves onto said light-quantity measuring means.

19. The spectrum measuring equipment of claim 2, wherein said light-quantity measuring equipment includes a slit which is irradiated with separated light of said two polarized wave components from said dispersing element and which selectively extracts with a width of a desired wavelength, the length of said slit being selected such that said polarized wave component thus extracted passes through the slit without being cut off in a direction perpendicular to said direction of light separation.

20. The spectrum measuring equipment of claim 3, wherein said light-quantity measuring equipment includes a slit which is irradiated with separated light of said two polarized wave components from said dispersing element and which selectively extracts with a width of a desired wavelength, the length of said slit being selected such that said polarized wave component thus extracted passes through the slit without being cut off in a direction perpendicular to said direction of light separation.

21. The spectrum measuring equipment of claim 5, wherein said light-quantity measuring equipment includes a slit which is irradiated with separated light of said two polarized wave components from said dispersing element and which selectively extracts with a width of a desired wavelength, the length of said slit being selected such that said polarized wave component thus extracted passes through the slit without being cut off in a direction perpendicular to said direction of light separation.

22. The spectrum measuring equipment of claim 2, wherein said double-image polarizing element is disposed so that said two polarized wave components are shifted with respect to each other in a direction perpendicular to said direction of light separation.

23. The spectrum measuring equipment of claim 3, wherein said double-image polarizing element is disposed so that said two polarized wave components are shifted with respect to each other in a direction perpendicular to said direction of light separation.

24. The spectrum measuring equipment of claim 5, wherein said double-image polarizing element is disposed so that said two polarized wave components are shifted with respect to each other in a direction perpendicular to said direction of light separation.

* * * * *

UNITED STATES PATENT AND TRADEMARK OFFICE
CERTIFICATE OF CORRECTION

PATENT NO. : 5,080,486

DATED : JANUARY 14, 1992

INVENTOR(S) : MASATAKA SHIRASAKI ET AL.

It is certified that error appears in the above-identified patent and that said Letters Patent is hereby corrected as shown below:

Col. 1,     line 11, "prison" should be --prism--.

Col. 2,     line 10, "the" should be deleted;
               line 66, "of the" should be --of the dispersing element without the--.

Col. 3,     line 22, "equal Hence," should be --equal. Hence,--;
               line 66, "FIG." should be --FIGS.--.

Col. 4,     line 36, "24 and 25" should be --24 and 25 which are--;
               line 68, "14" should be --14.--.

Col. 6,     line 14, ", of" should be --of--;
               line 41, "the," should be --the--;
               line 42, "wavelength" should be --wavelength,--;
               line 45, "retains," should be --retains--;
               line 47, "element." should be --element 14.--;
               line 58, "$\cdot P_{in}\lambda,p)$" should be --$P_{in}(\lambda,p)$--;
               line 60, "(80, p)" should be --$(\lambda,p)$--;
               line 66, "$P_{to(\lambda)}$" should be --$P_{ot}(\lambda)$--.

UNITED STATES PATENT AND TRADEMARK OFFICE
CERTIFICATE OF CORRECTION

PATENT NO. : 5,080,486

DATED : JANUARY 14, 1992

INVENTOR(S) : MASATAKA SHIRASAKI ET AL.

It is certified that error appears in the above-identified patent and that said Letters Patent is hereby corrected as shown below:

Col. 8, line 6, "its" should be deleted;
line 11, "to" (first occurrence) should be --into--;
line 22, "Of" should be --of--;
line 25, "16" should be --16,--;
line 64, "ca" should be --can--.

Signed and Sealed this

Twenty-fifth Day of May, 1993

Attest:

MICHAEL K. KIRK

Attesting Officer

Acting Commissioner of Patents and Trademarks